Dec. 10, 1968  J. T. FRYDRYK  3,415,147
BAG CUTTER
Filed Oct. 20, 1966  5 Sheets-Sheet 1

INVENTOR
JOHN T. FRYDRYK
BY  John H. Tregoning
ATTORNEY

Dec. 10, 1968    J. T. FRYDRYK    3,415,147
BAG CUTTER

Filed Oct. 20, 1966    5 Sheets-Sheet 2

To Motor

INVENTOR
JOHN T. FRYDRYK
BY
ATTORNEY

Dec. 10, 1968
J. T. FRYDRYK
3,415,147
BAG CUTTER
Filed Oct. 20, 1966
5 Sheets-Sheet 3
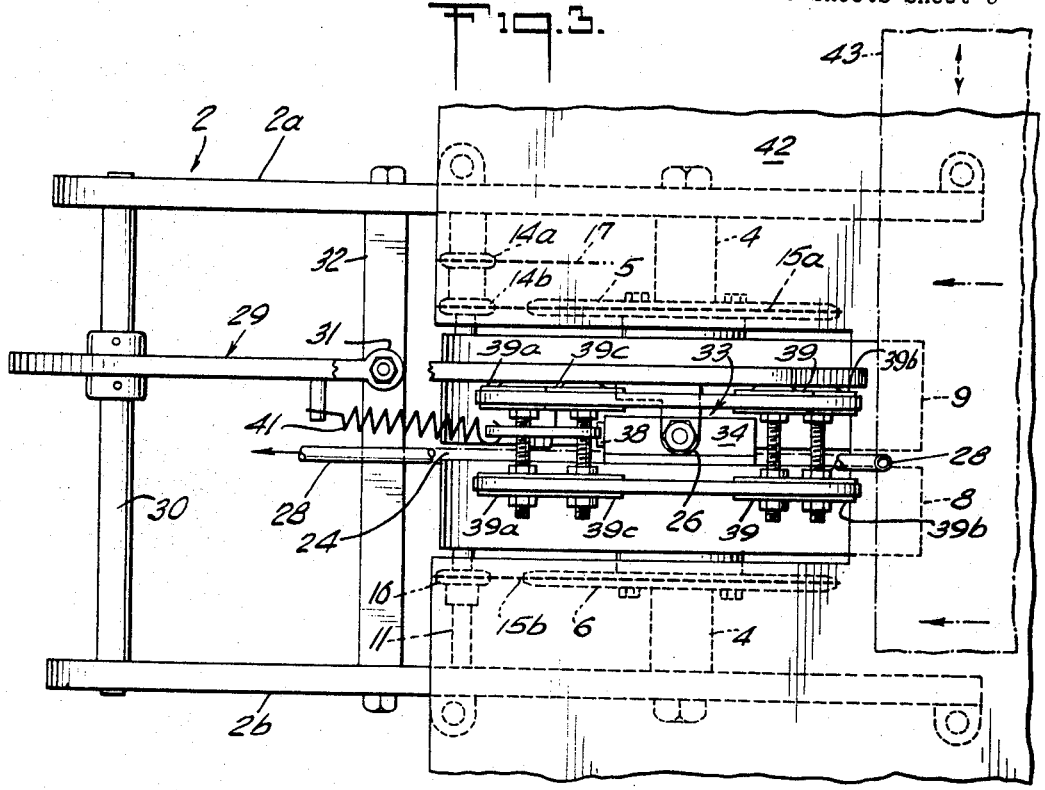
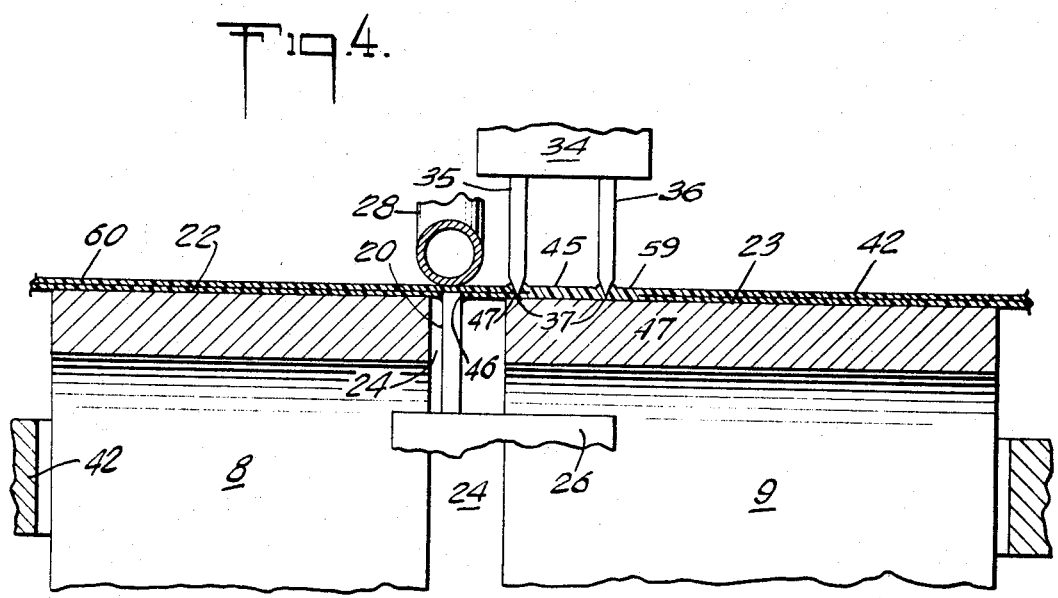
INVENTOR
JOHN T. FRYDRYK
BY
ATTORNEY Dec. 10, 1968   J. T. FRYDRYK   3,415,147
BAG CUTTER
Filed Oct. 20, 1966   5 Sheets-Sheet 4
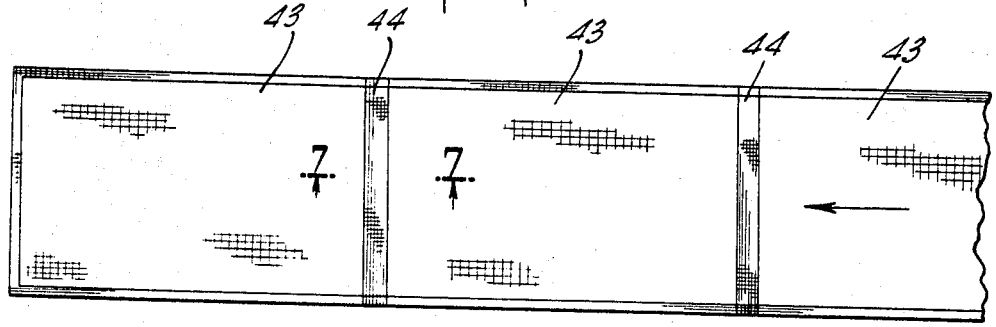
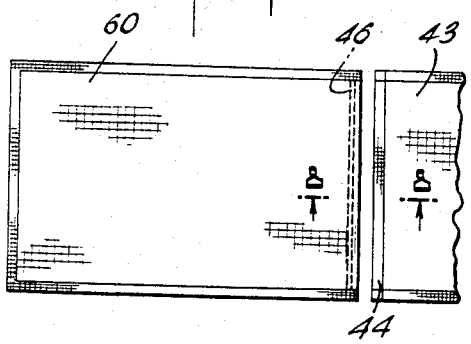
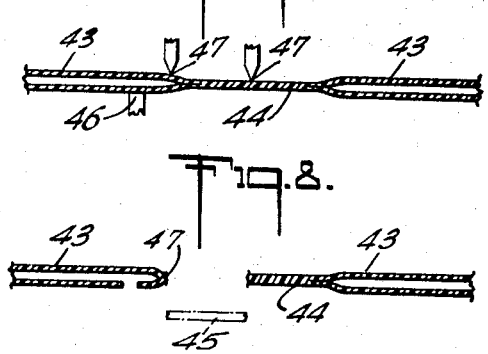
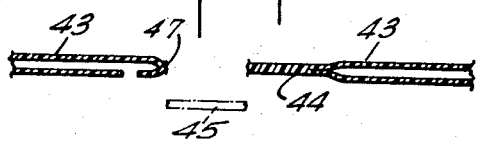
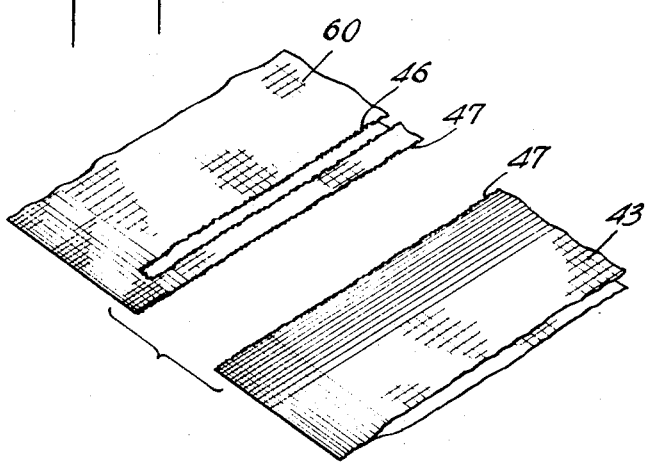
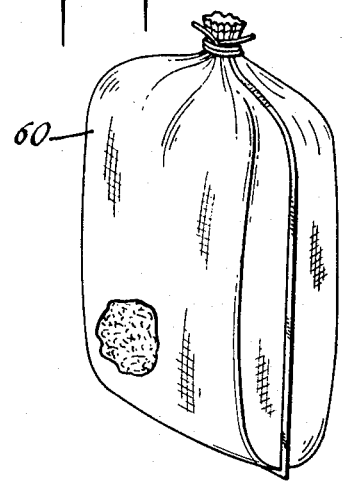
INVENTOR
JOHN T. FRYDRYK
BY
ATTORNEY Dec. 10, 1968  J. T. FRYDRYK  3,415,147
BAG CUTTER
Filed Oct. 20, 1966  5 Sheets-Sheet 5
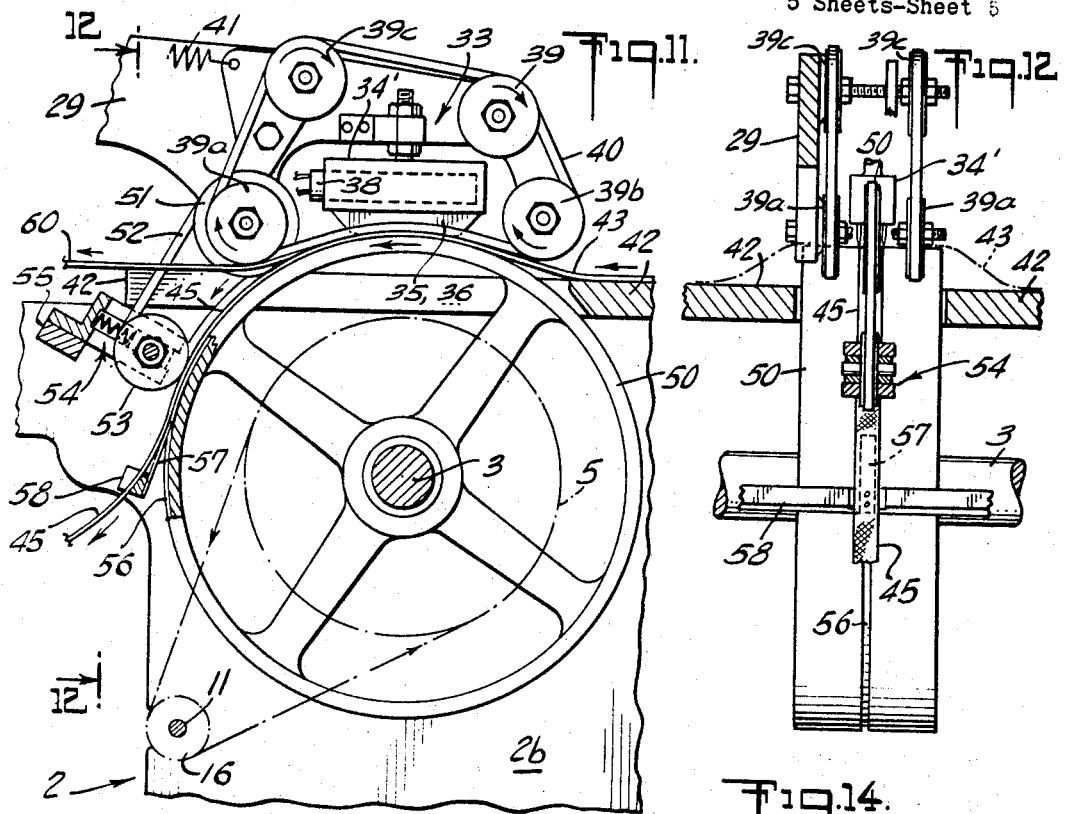
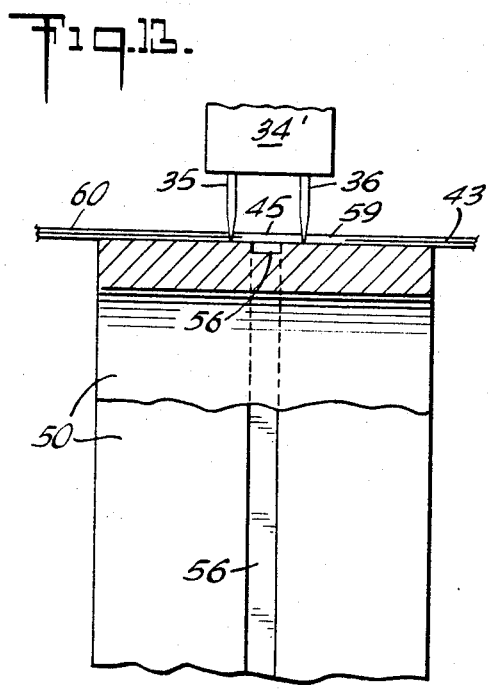
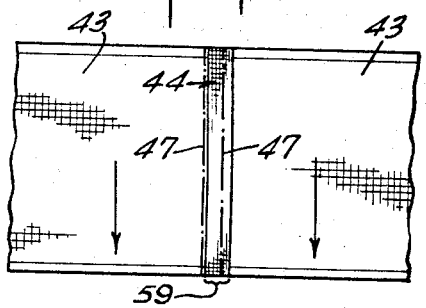
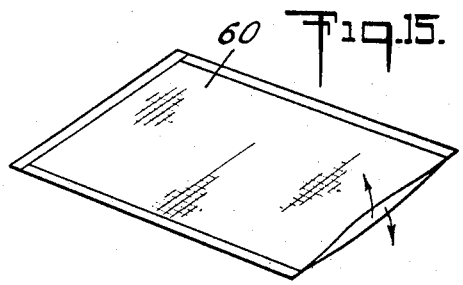
INVENTOR
JOHN T. FRYDRYK
BY
ATTORNEY

United States Patent Office 3,415,147
Patented Dec. 10, 1968

3,415,147
BAG CUTTER
John T. Frydryk, Springfield, Mass., assignor to Johnson & Johnson, a corporation of New Jersey
Filed Oct. 20, 1966, Ser. No. 588,215
6 Claims. (Cl. 83—171)

ABSTRACT OF THE DISCLOSURE

Apparatus for cutting individual bags from continuous two-ply textile bag fabric. Twin rotating feed surfaces are mounted in spaced relationship to each other. A first heated blade is positioned intermediate the rotating surfaces and a second heated blade having spaced twin severing surfaces is positioned to place its severing surfaces of the first severing means and abutting a line passing through the periphery of the rotating surfaces. Guide means urge the fabric into contact with the rotating surfaces to feed the fabric past the severing blades whereby the fabric is severed along a line by the first blade and whereby one face ply of the fabric is severed along another line by the second blade to provide internal access to the fabric.

---

In many normal textile operations, bag fabric is produced of continuous lengths of two-ply fabric from which individual bags are cut. The cutting operation is accomplished by hand labor. Thus, it suffers from the economies that this hand labor involves, as well as from the accuracy of the results. The present invention overcomes these and other difficulties by providing an apparatus for cutting individual bags from continuous textile bag fabric, said apparatus comprising a frame, a cutting surface, severing means adjustably mounted on said frame adjacent said cutting surface, frame-mounted guide means for receiving and tensionally urging said continuous bag fabric across said cutting surface into severing line contact with said severing means and a motor means for driving said guide means.

The preferred apparatus for the instant invention comprises a frame, twin rotating surfaces mounted on said frame in spaced complementary relationship to align the periphery of each, a frame-mounted heated first severing means positioned intermediate said rotating surfaces to insure a contiguous relationship between the severing surfaces of said first means and a line joining the periphery of said surfaces, a cooling member positioned adjacent to severing surfaces of said first means, a frame-mounted heated second severing means having spaced twin severing surfaces, said means positioned to place its severing surfaces juxtaposed the severing surface of said first means and abutting a line passing through the periphery of said said rotating surfaces, guide means frictionally positioned contiguous to the periphery of said rotating surfaces, said guide means being adapted to receive and tensionally urge said multi-ply textile fabric into intimate contact with a severing surface of said first and second means whereby said fabric is severed along parallel lines resulting in the removal of a segment of said bag fabric and heat sealed closed along said line and whereby one face of said fabric is severed along a line and heat sealed to preclude raveling to provide internal access into said fabric and motor means adapted to drive said twin rotating surfaces.

This invention is adapted for use with textile fabric constructed wholly or in part of thermoplastic synthetic fabric, since the severing is accomplished by heated means designed to completely separate the fabric along a line, as well as to heat seal the ends of the fabric along the line of separation to prevent raveling. Thus, the temperature of the severing surfaces is adjusted to a temperature which will soften the synthetic fibers as it severs them such that bunching or massing or joining of the melted end portions of the textile filaments will be of a magnitude sufficient to preclude the individual fibers or threads from being displaced from their individual positions in the weave of the fabric. Raveling along the line of severance is, therefore, precluded.

The invention will be more readily understood by reference to the accompanying drawings representing a preferred embodiment wherein:

FIG. 3 shows a top view of the preferred embodiment of this invention,

Figure 1:
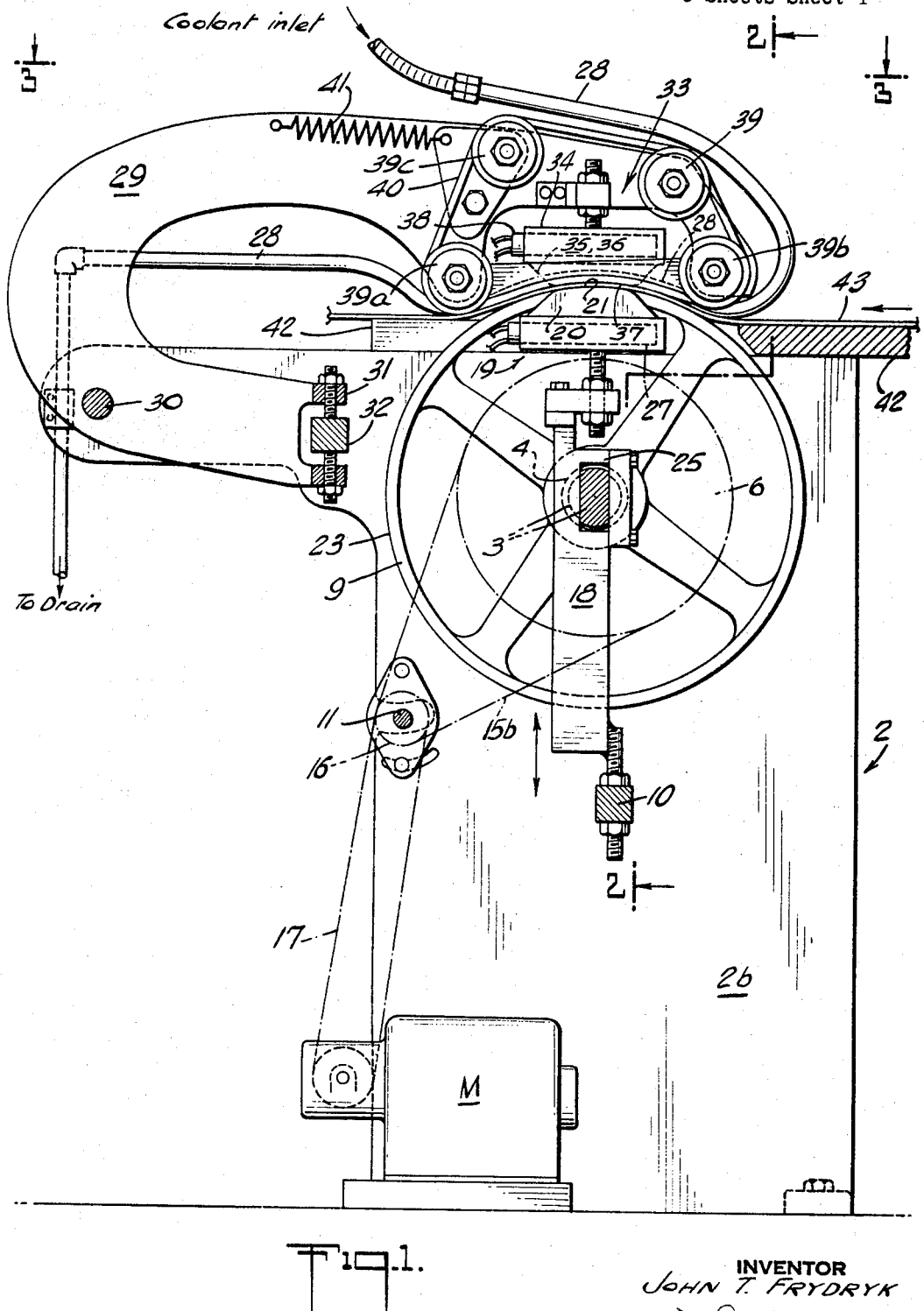
FIG. 1 shows a side view of the preferred embodiment of this invention.
Figure 2:
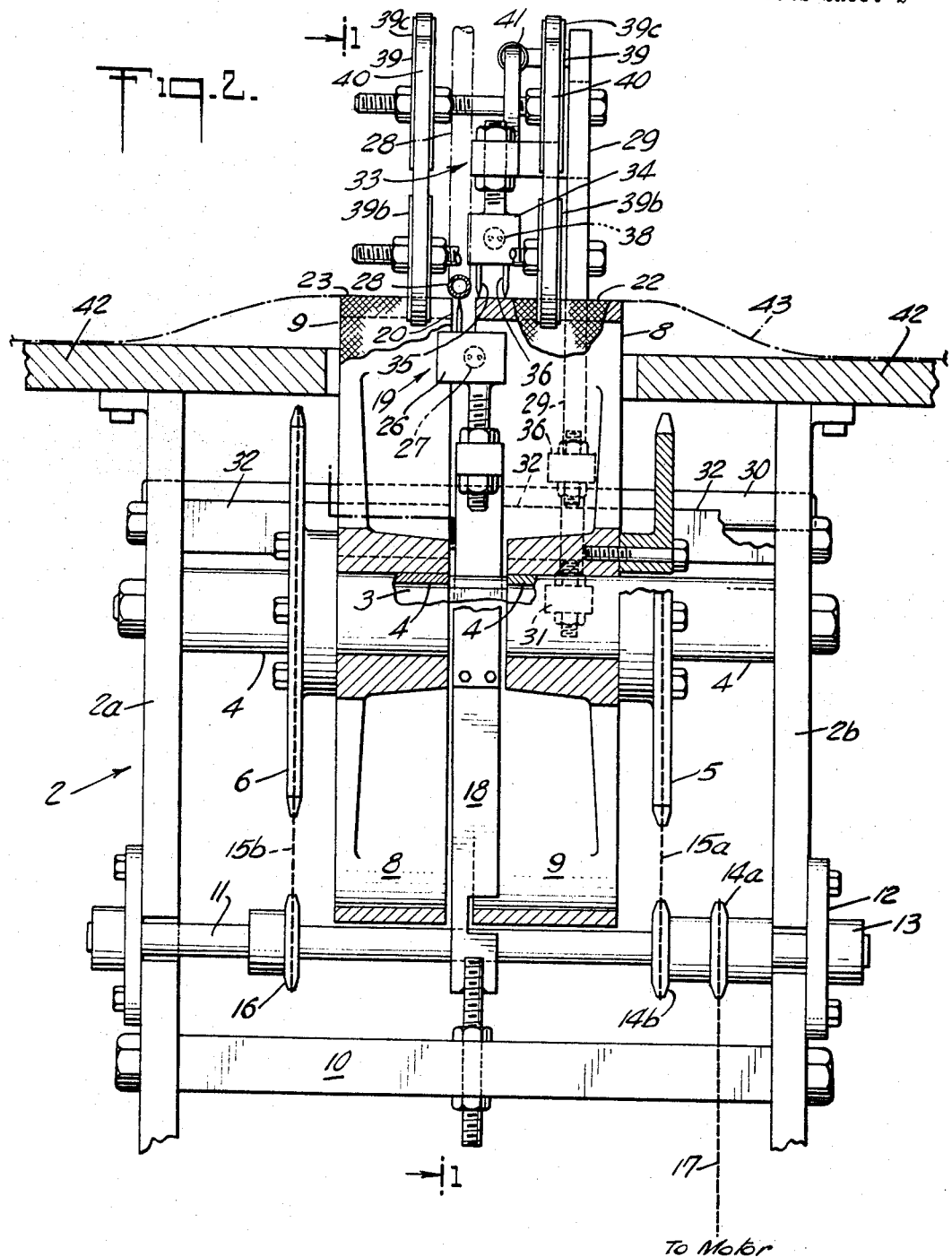
FIG. 2 shows an end view of the preferred embodiment of this invention.

FIG. 4 depicts an enlarged detailed view of the specific severing means of the apparatus of FIG. 2, FIG. 5 shows a continuous bag fabric, FIG. 6 shows an individual bag, taken from the continuous fabric of FIG. 5, utilizing the apparatus of FIGS. 1–4, FIG. 7 is an enlarged cross section taken along A—A of FIG. 5, FIG. 8 shows the cross section of FIG. 7 after severance has taken place, FIG. 9 is an enlarged sectional view showing a line of severance and the interior openings of the bag of FIG. 6, FIG. 10 shows a bag severed by using the apparatus of FIGS. 1–4, filled with a foreign material and closed, FIG. 11 is a cut away portion of the apparatus of FIG. 1 with some modification and with added embodiments, FIG. 12 is an end view of the embodiment of this invention shown in FIG. 11, FIG. 13 is an enlarged cross sectional view of the severing means of the apparatus depicted in FIG. 11, FIG. 14 is a cut away section taken from a continuous bag fabric, and FIG. 15 is an individual bag taken from the fabric of FIG. 14 utilizing the apparatus of FIG. 11.

Referring to FIGS. 1 and 2, two pulleys 8 and 9 are coaxially mounted on axle 3 which is journaled into frame 2 such that a space 24 separates each of the pulleys. A stationary shaft spacer surrounds the axle 3 over its length and abuts the frame 2 and pulleys 8 and 9 to insure the space rigid relationship between the two leg segments of 2a and 2b of frame 2. Sprocket wheels 5 and 6 are securely mounted on pulleys 8 and 9. A second and third spacer shaft 7 and 10 are secured to the leg segments 2a and 2b of frame 2 to insure positioning and rigidity of the frame. Each of the pulleys 8 and 9 has a curved rim, 22 and 23 respectively, of considerable width. The pulleys 8 and 9 are twins and the rims 22 and 23 are therefore matching. Being commonly rotatably mounted on axle 3, the periphery of the surfaces of the rims 22 and 23 of pulleys 8 and 9 are aligned such that an extended line passing widthwise of one rim and contiguous to its surface would likewise pass contiguous to the rim surface of its twin.

A second axle 11 is journaled in the leg segments of frame 2 and secured by thrust plate 12 and the collar 13. Twin sprockets 14a and 14b are fixably mounted on the axle 11 such that sprocket 14b is aligned with sprocket wheel 5. A pitch chain 15a is commonly geared to sprocket wheel 5 and sprocket gear 14a. Similarly a sprocket 16 is fixably mounted on axle 11 and aligned with sprocket 6. A pitch chain 15b is commonly geared to both sprocket 16 and sprocket wheel 6. Sprocket 14a is geared by pitch chain 16 to a motor which drives the apparatus.

A solid shaft 18 adjustably mounted on spacer shaft 7 extends to position a lower heated-severing unit 19 within the space 24 separating pulleys 8 and 9 such that the severing element 19, which is composed of a severing plate 20 having a curved severing surface 21 substantially matching the periphery of pulleys 8 and 9, is positioned such that its curved surface intersects an imaginary straight line transversing the periphery of each of the rims 22 and 23. The curved severing surface 21 of plate 20 is blunted and of convex configuration along its length, the latter construction being provided to permit the severing surface 21 to match the rim surfaces 22 and 23 along their lengthwise periphery. The shaft 18 is machined to provide a space 25 sufficiently removed on all sides from the surface of the spacer shaft 4 (which passes through the space 25) to permit vertical adjustment.

The lower heated-severing unit 19 may or may not be adjustably mounted on the shaft 18 which may or may not be adjustable although the lower heated-severing unit should be adjustable. The severing plate 20 is fixably mounted in a hollowed block 26 of metal which is a good conductor of heat. The hollowed core of block 20 is fitted with a tubular cartridge heater 27. A copper tubing 28 is positioned adjacent the curve of severing surface 21 of the heated-severing unit 19. The copper tubing 28 is connected to a cooling fluid source which forces the fluid along the tube to control the temperature of the severing surface 21.

An arm 29 of frame 2 is pivotally mounted on rod 30 which is in turn securely mounted in like segments 2a and 2b of frame 2. At the pronged end 31 of arm 29, an adjusting element 31 threadably engaging the fixed square rod 32, which is attached to and spans the legs 2a and 2b of frame 2, enables filtered rotating adjustment of arm 29 about the pivot rod 30.

Adjustably mounted on the arm 29 is an upper heating severing element 33 defined by a cord block 35 of heat conducting metal having two twin severing plates 35 and 36 projecting from metal block 34 toward the rim surface 22 of pulley 8. The severing surfaces 37 of plates 35 and 36 are positioned adjacent the rim surface of the sprocket wheel 8. They are pointed and concaved along their length to conform or match the periphery of the rim surface 22. The heating cartridge 38 is positioned in the core of the metal block 34 to provide the heat source for the upper heated-severing unit 33. Two sets of four spaced idler pulleys 39a, 39b, 39c, and 39d are rotatably mounted on arm 29 in position to maintain tension on the V-belts 40, each one of which passes around one set of the four pulleys. Each idler pulley is coaxially mounted with its corresponding member of the other set (see FIG. 3). The lower two idler pulleys, 39a or 39b, of each set are fixedly positioned below the rim of pulley wheels 8 and 9 such that both of the V-belts 40 will frictionally engage the rim surfaces, i.e. 22 and 23, of the pulleys 8 and 9. The idler pulleys 39a and 39b are positioned so that each of the V-belts 40 will frictionally engage the rims 22 and 23 of pulleys 8 and 9 immediately adjacent the commonly aligned cutting surfaces 21 and 37 of heated-severing units 19 and 33 for a distance along each rim exceeding the length of each of the cutting surfaces 21 and 37. One pair of idler pulleys 39c is movably mounted on the arm 29 and held under tension by spring 41. This is to provide such tension on each of the V-belts 40, that the frictional engagement of each of these V-belts with the surface of the respective pulleys 8 and 9 that it engages, is insured.

A table top support 42 is mounted on each of the legs 2a and 2b of frame 2.

FIG. 3 is a top view showing two sets of idler pulleys 39. These sets are paired and each pair of each set is rotatably mounted on a common axle. The two sets of idler pulleys 39 are positioned one on either side of the space separating the commonly aligned pulleys 8 and 9, and spring 41 mounted on arm 29 is connected to the common axle on which the paired idler pulleys 39c are mounted and provides an equal tension on belt 40. Thus the frictional engagement of each of the belts 40 on the rim surface of pulleys 8 and 9 is the same. A continuous textile bag fabric resting on the table top of support 42 is depicted in position to be fed to the apparatus.

FIG. 4 is a greatly enlarged view showing the rim surface of pulleys 8 and 9 in cross section, the lower end heated-severing units 19 and 33 with their projecting severing plates 20, 34 and 35 respectively. The severing surface 21 of plate 20 is blunt and occupies the space operating pulleys 8 and 9 while the severing surfaces 37 of plates 34 and 35 are pointed and substantially abut the rim surface 23 of pulley 9. The copper tubing 28 which contains a cooling fluid is positioned adjacent the severing surface 21 in a close spaced relationship. A tubular textile bag fabric 43 is shown resting on the rim surface 22 and 23 of the pulleys 8 and 9 in position just prior to being engaged by the severing surface of the lower and upper heated-severing units.

FIG. 5 shows a plain view of a continuous length of textile fabric 43 made of synthetic filaments. The fabric is two-ply and is interrupted along its length by widthwise single-ply cutting strips 44 (see FIG. 7). The longitudinal edges of the fabric 43 are woven in a single-ply weave since they define the edge of the individual bag fabrics which will be taken from it and will receive the brunt of the wear factors that the bag will receive. FIG. 7 is a cross section taken through lines 7—7 of FIG. 5 to show the ply construction of the bag fabric 43 and the cutting strips 44.

FIG. 6 depicts a bag cut from the continuous bag fabric 43 (shown in FIG. 5) by the preferred embodiment of this invention (shown in FIGS. 1–4). FIG. 8 is an enlarged cross section taken along 8—8 of FIG. 6 showing the severance performed by the apparatus of this invention on fabric 43. The portion 45 cutaway is seen to consist largely of the single-ply cutting strip 44, but to include a portion of the two-ply textile bag fabric 43. A more realistic view of the severance depicted in FIGS. 6 and 8 is shown in FIG. 9. Since the textile fabric 43 is constructed of synthetic filaments the fabric has not only been severed along the lines 46 and 47, but the edges have been heat sealed to prevent raveling of the filaments. The section B defines the closed widthwise end of the bag where the end closure is the section of single-ply cutting strips remaining after separation of the individual bag from the continuous bag fabric.

FIG. 10 shows a bag 60 severed from the continuous textile bag fabric of FIG. 5 by the apparatus of this invention.

In actual operation, the continuous bag fabric 43 is fed across the table support 42 in either of the directions given by the double headed arrow of FIG. 3. The operator aligns the area to be severed with the severing plates 20, 35 and 36 and guides the fabric 42 in the direction given by the two small arrows in FIG. 3 toward the severing plates. The motor shown in FIG. 1 rotatably drives pitch chain 17 which rotates the axle 11 having sprocket gears 14a, 14b and 16 which, through pitch chains 15a and 15b geared to sprocket wheels 8 and 9 respectively, cause the pulleys 8 and 9 to rotate. Each of the V-belts 40 passing over the set of idler pulleys 39 is in frictional engagement with the rim surface of pulleys 8 and 9; therefore, the V-belts are put in motion by the rotation of pulleys 8 and 9. As the fabric 43 is urged toward the severing plates 20, 35 and 36 by the operator, simultaneous contact with each of the rotating V-belts 40 and rim surface 22 and 23 of the pulleys 8 and 9 is made, and the fabric is made to pass in intimate contact with the severing surfaces 21 and 37 of the severing plates, whereupon the bag fabric 40 is cut away along a predetermined line.

The V-belt is of a preferably rubber or rubber-like composition; however, it may be of any suitable construction or composition which will permit frictional contact with the textile fabric. The rim surfaces of the pulleys 8 and 9 are preferably roughened or otherwise marked or coated with an adhesive or abrasive material to preclude fabric slippage across its surface to maintain fabric position as it passes over the severing surfaces of heated-severing units 19 and 33. Thus, fabric slippage is precluded and fabric positioning along a straight line is insured.

With specific reference to FIG. 4, the two-ply bag fabric 42 is shown in position to pass into intimate contact with the severing plates 20, 35 and 36. The single-ply cutting strip 44 is positioned such that a strip A of it will be taken from the fabric from edge to edge (see FIGS. 6, 7 and 8). The severing surfaces 37 of severing plates 35 and 36 are pointed and in very near contact with the rim surface 22 of pulley 8, since the severance performed on the bag fabric 43 at these points is intended to be complete. The severing surface 21 of severing plate 20 is blunted and has the copper tubing 28, carrying a cooling fluid, positioned a distance from its surface sufficient to permit the two-ply fabric 42 to pass therebetween and sufficient to allow intimate contact or nearly such between the surface of the copper tubing 28 and the ply of the fabric exposed to it. Due to the cutting surface 21 of the lower heating-severing element 19 being blunted, and because the surface of the cooling copper tubing 28 is touching or nearly touching the face ply of fabric adjacent to it, the severance along the line of severance defined by the heated plate 20 and the severing surface of the lower heated-severing unit 19, is restricted to the ply of fabric contiguous to severing surface 21, and the integrity of the upper ply, i.e., the ply touching or in close proximity to the cooling copper tubing 28, along that line is kept intact. The gripping action of the rotating pulleys 8 and 9, frictionally causing belts 40 to rotate, keeps the fabric taut. Thus, in the absence of slack, the fabric 42 is kept from sagging as it passes over the space between pulleys 8 and 9, and the line of severance generated by the frictional engagement of the V-belts 40 and the pulleys 8 and 9 is precluded from being other than a straight line. As the single-ply longitudinal edges pass between the cooling tubing 28 and the severing surface 21 of the lower heated-severing unit 19, the cooling action of the tubing 28 is sufficient to prevent severance of the ply adjacent to cooling at this point and the opening into the bag interior is terminated.

The bag fabric 43 is constructed wholly or in part of thermoplastic synthetic fibers so that as the bag is severed, as defined above, by passing it into intimate contact with the severing plates 21 and twin plates 35 and 36, the fibers along the line of severance are heat sealed to prevent raveling. This heat sealing is brought about by causing the melted terminus of the fiber to join with the like terminus of its neighbor and/or by the provision of a mass at the terminus sufficient to preclude fiber displacement from the weave of the fabric. If the fabric is only partially constructed of thermoplastic fibers, the bag is passed into the apparatus of FIGS. 1–3 such that the thermoplastic fibers will run at right angles to the severing plates. Thus the edges of the thermoplastic fibers will be heat sealed as defined above and raveling of the fabric is thereby precluded.

In other embodiments of this invention, it is perfectly feasible to have one severing plate 35 or 36 in the upper heated-severing unit 33 and thus not cut a segment from the bag material but simply sever along a widthwise line extending to each of the longitudinal edges of the bag. It is also feasible to permit the upper heated-severing unit 33 to be altered as just indicated, and to also entirely remove the lower heated-severing unit 19. In this instance the fabric would simply be severed along the line extending to each of its longitudinal edges. For other severing uses, one might equally as well remove the upper heated-severing unit 33 from fabric contact.

FIG. 11 shows in a cut away side view, a modified portion of the apparatus of FIG. 1 and thus another embodiment of this invention. The two pulleys 8 and 9 have been combined into a single pulley 50. The upper heating severing unit 33 remains the same, having the cored block 34, severing plates 35 and 36 (see FIG. 13), and heating cartridge 38. The two sets of four spaced idler pulleys 39 are the same; however, a fifth pulley, i.e. a spring pressed idler pulley 53 mounted on support bar 55, is pressurably engaging the peripheral surface of pulley 50 due to the action of spring pressure means 54. A guide pulley 51 is commonly mounted with intermediate pulleys 39a (see FIG. 33). Both spring pressed idler pulley 53 and guide pulley 51 have a recessed peripheral surface adapted to receive V-belt 52, which is mounted on these pulleys. Pulley 51, being commonly mounted on the same axle with pulleys 39a, is driven, as are pulleys 39, by the frictional engagement of V-belts 40 with motor driven rotating pulley 50. The guide pulley 51 is mounted such that it also frictionally engages the periphery of pulley 50.

The peripheral surface of pulley 50 is provided with an annular groove 56, which is shown in FIG. 12, and guide pulley 51, together with spring pressed idler pulley 53, are mounted such that the periphery of each frictionally engages the peripheral surface of pulley 50 in the area of the annular groove 56. Both pulleys 51 and 53 are of greater width than annular groove 56; however, they are so mounted with respect to that groove that an exposed portion of V-belt 52, mounted on pulleys 51 and 53, does project into the annular groove 56. A spring finger stripper 57 is mounted on a support bar 58 attached to frame 2, and engages the peripheral surface of pulley 50 at the point of annular groove 56 below pulley 53. Stripper 57 is of a width greater than groove 56.

FIG. 13 shows an enlarged cross sectional view of the upper heating severing unit 34 of FIG. 11 positioned such that each of the severing plates 35 and 36 spans the annular groove 56. The continuous two ply synthetic textile bag fabric 43 (having intermediate single ply cutting strips 59 as shown in FIG. 14) is positioned on the peripheral surface of pulley 50 in position for severance by the action of heated severing blades 35 and 36.

In actual operation the textile bag fabric 43 is fed to the apparatus shown in FIG. 11 at the point on the table top support 42 shown by the arrow to the right of idler pulleys 39. Once again, the fabric 43 is positioned such that the heated severing blade 35 severs the continuous bag fabric along the two ply body section of the fabric while severing blade 36 severs the fabric along a line in the single ply cutting strip 59. A strip of material 45 above groove 56 is cut away. The strategically positioned guide pulley 51 and more specifically V-belt 52 mounted thereon and projecting into annular groove 56 pressurably engages the cut away strip 45. The V-belt 52, being mounted on pulleys 51 and 53, carries the cut away strip 45 placed against the surface of pulleys 50 and specifically, into groove 56 away from the individual bag fabric 60 being discharged in the left side of the apparatus being shown in FIG. 11. After passing beneath spring pressed idler pulley 53, the cut strip 45 is pealed from the pulley 50 by spring finger stripper 57 and discharged as scrap. Thus the cutaway portion 45 is lead away from possible entanglement with the apparatus or from possible adherence (due to its momentarily near liquid edges of severance) and entanglement with the individual bags hereby provided.

The severed individual bags 60 taken from bag fabric 43 are passed out on table top support 42 to the left of pulley 50 in FIG. 11, whereupon an operator quickly separates the two ply fabric along the line of severance caused by severing plate 35 in the two ply portion of the bag fabric 43. This is accomplished quickly before the near liquid edges of the severed line in the two ply fabric cools and fuses. The individual bag fabric 60 is shown in FIG. 15. The opening to the interior of the bag has been provided, as just disclosed, by the machine operator, and the edges of the fabric at the opening are fused by the heated severing action of heating element 34, and thus raveling is prevented.

The embodiment of this invention, disclosed in FIGS. 11–13 as heating element 34, is maintained at a temperature above 250° F. to insure a near liquid along the line of severance provided by the severing action of plates 35 and 36. This permits the machine operators to easily separate the two ply fabric along the line of severance to permit the opening into bag 60 shown in FIG. 15.

What is claimed is:
1. An apparatus for severing textile fabric which comprises:
(A) A frame,
(B) Twin rotating surfaces mounted on said frame in spaced complementary relationship to align the periphery of each,
(C) A frame-mounted, heated first severing means positioned intermediate said rotating surfaces to insure a contiguous relationship between the severing surface of said first means and a line joining the periphery of said surfaces,
(D) A cooling member positioned adjacent the severing surface of said first means,
(E) A frame-mounted, heated second severing means positioned to place its severing surface juxtaposed the severing surface of said first means and abutting a line passing through the periphery of said rotating surfaces,
(F) Guide means frictionally positioned contiguous to the periphery of said rotating surfaces, said guide means being adapted to receive and tensionally urge said multi-ply textile fabric into intimate contact with the severing surfaces of said first and second means whereby said fabric is severed and heat sealed closed along a line and whereby one face ply of said fabric is severed along a line to provide internal access into said fabric and heat sealed along said severed line to preclude raveling, and
(G) Motor means adapted to drive said twin rotating surfaces.

2. An apparatus for severing textile bag fabric which comprises:
(A) A frame,
(B) Twin rotating surfaces mounted on said frame in spaced complementary relationship to align the periphery of each,
(C) A frame-mounted, heated first severing means positioned intermediate said rotating surfaces to insure a contiguous relationship between the severing surface of said first means and a line joining the periphery of said surfaces,
(D) A cooling member positioned adjacent the severing surface of said first means,
(E) A frame-mounted, heated second severing means having spaced twin severing surfaces, said means positioned to place its severing surfaces juxtaposed the severing surface of said first means and abutting a line passing through the periphery of said rotating surfaces,
(F) Guide means frictionally positioned contiguous to the periphery of said rotating surfaces, said guide means being adapted to receive and tensionally urge said multi-ply textile fabric into intimate contact with the severing surfaces of said first and second means whereby said fabric is severed along parallel lines resulting in the removal of a segment of said bag fabric and heat sealed closed along said line and whereby one face of said fabric is severed along a line, and heat sealed to preclude raveling, to provide internal access into said fabric, and
(G) Motor means adapted to drive said twin rotating surfaces.

3. An apparatus for severing multi-ply textile bag fabrics which comprises:
(A) A frame,
(B) Twin rotating surfaces coaxially mounted on said frame in spaced complementary relationship whereby the periphery of each surface is commonly aligned with its twin,
(C) A heated first severing means adjustably mounted on said frame and positioned within the space intermediate said rotating surfaces to insure a contiguous relationship between the severing surface of said first means and a line joining the periphery of said rotating surfaces,
(D) A cooling member positioned adjacent the severing surface of said first means, in close spaced relationship to its severing surface,
(E) A heated second severing means adjustably mounted on said frame and positioned to place its severing surface juxtaposed said first surface and abutting the periphery of one of said twin rotating surfaces,
(F) Rotating guide means frictionally disposed against the periphery of said twin rotating surfaces and adapted to receive the fabric into intimate contact with the severing surfaces of said first and second means whereby the fabric is severed and heat sealed closed along a line and whereby one face ply of said fabric is severed along a line to provide an internal access opening into said fabric and heat sealed along said severed line to preclude raveling, and
(G) Motor means adapted to drive said twin rotating surfaces.

4. An apparatus for severing multi-ply textile bag fabric which comprises:
(A) A frame,
(B) Twin rotating surfaces coaxially mounted on said frame in spaced complementary relationship whereby the periphery of each surface is commonly aligned with its twin,
(C) A heated first severing means adjustably mounted on said frame and positioned within the space intermediate said rotating surfaces to insure a contiguous relationship between the severing surface of said first means and a line joining the periphery of said rotating surfaces,
(D) A cooling member positioned adjacent the severing surface of said first means, in close spaced relationship to its severing surface,
(E) A frame-mounted, heated second severing means having spaced twin severing surfaces, said means positioned to place its severing surfaces juxtaposed the severing surface of said first means and abutting a line passing through the periphery of said rotating surfaces,
(F) Guide means frictionally positioned contiguous to the periphery of said rotating surfaces, said guide means adapted to receive and tensionally urge said multi-ply textile fabric into intimate contact with the severing surfaces of said first and second means whereby said fabric is severed along parallel lines resulting in the removal of a segment of said bag fabric and heat sealed closed along said line and whereby one face of said fabric is severed along a line, to provide internal access into said fabric and heat sealed along said severed line to preclude raveling, and
(G) Motor means adapted to drive said twin rotating surfaces and said guide means.

5. An apparatus for severing multi-ply textile bag fabrics which comprises:
(A) A frame,
(B) Twin rotating surfaces coaxially mounted on said frame in spaced complementary relationship whereby the periphery of each surface is commonly aligned with its twin,
(C) A heated severing means adjustably mounted on said frame and positioned within the space intermediate said rotating surfaces to insure a contiguous relationship between the severing surface of said means and a line joining the periphery of said rotating surfaces,
(D) A cooling member positioned adjacent the severing surface of said first means, in close spaced relationship to its severing surface, (E) Guide means frictionally positioned contiguous to the periphery of said rotating surfaces, said guide means being adapted to receive and tensionally urge said multi-ply textile fabric into intimate contact with the severing surface of said severing means whereby one face of said fabric is severed along a line to provide internal access into said fabric and heat sealed along said severed line to preclude raveling, and (F) Motor means adapted to drive said twin rotating surfaces and said guide means.

6. An apparatus for severing multi-ply textile bag fabric which comprises:

(A) A frame, (B) Twin rotating surfaces coaxially mounted on said frame in spaced complementary relationship whereby the periphery of each surface is commonly aligned with its twin, (C) A frame-mounted, heated severing means having spaced twin severing surfaces, said means positioned to place its severing surfaces juxtaposed the severing surface of said first means and abutting a line passing through the periphery of said rotating surfaces, (D) A cooling member positioned adjacent the severing surface of said first means, in close spaced relationship to its severing surface, (E) Guide means frictionally positioned contiguous to the periphery of said rotating surfaces, said guide means being adapted to receive and tensionally urge said multi-ply textile fabric into intimate contact with the severing surface of said severing means whereby said fabric is severed along parallel lines resulting in the removal of a segment of said bag fabric and heat sealed closed along said line, and (F) Motor means adapted to drive said twin rotating surfaces and said guide means.

References Cited

UNITED STATES PATENTS

| | | | |
|---|---|---|---|
| 2,596,400 | 5/1952 | Hill | 83—171 |
| 2,756,819 | 7/1956 | Judelson | 83—171 X |
| 3,165,951 | 1/1965 | Lindquist | 83—435 X |
| 3,320,111 | 5/1967 | Lucia et al. | 83—171 X |

JAMES M. MEISTER, *Primary Examiner.*

U.S. Cl. X.R.

83—170, 422, 434, 435, 925